United States Patent
Choi

(10) Patent No.: US 10,688,848 B2
(45) Date of Patent: Jun. 23, 2020

(54) AIR CONDITIONING SYSTEM FOR MOTOR VEHICLES

(71) Applicant: Hanon Systems, Daejeon (KR)

(72) Inventor: Ei Hyun Choi, Daejeon (KR)

(73) Assignee: Hanon Systems, Daejeon (KR)

( * ) Notice: Subject to any disclaimer, the term of this patent is extended or adjusted under 35 U.S.C. 154(b) by 358 days.

(21) Appl. No.: 15/544,734

(22) PCT Filed: Jan. 19, 2016

(86) PCT No.: PCT/KR2016/000517
§ 371 (c)(1),
(2) Date: Jul. 19, 2017

(87) PCT Pub. No.: WO2016/117894
PCT Pub. Date: Jul. 28, 2016

(65) Prior Publication Data
US 2017/0368909 A1    Dec. 28, 2017

(30) Foreign Application Priority Data

Jan. 20, 2015   (KR) .................. 10-2015-0009181
Jan. 15, 2016   (KR) .................. 10-2016-0005417

(51) Int. Cl.
*B60H 1/00* (2006.01)
*B60Q 5/00* (2006.01)
(Continued)

(52) U.S. Cl.
CPC ..... *B60H 1/00985* (2013.01); *B60H 1/00021* (2013.01); *B60H 1/00064* (2013.01);
(Continued)

(58) Field of Classification Search
None
See application file for complete search history.

(56) References Cited

U.S. PATENT DOCUMENTS

2010/0176938 A1*  7/2010  Maruyama ............. B60K 35/00
                                                340/438
2011/0183596 A1*  7/2011  Fischer .............. B60H 1/00964
                                                454/75
(Continued)

FOREIGN PATENT DOCUMENTS

JP   2000-247133 A    9/2000
JP   2005-081887 A    3/2005
(Continued)

OTHER PUBLICATIONS

International Search Report issued in PCT/KR2016/000517 dated May 17, 2016.

*Primary Examiner* — Christian Chace
*Assistant Examiner* — Kyung J Kim
(74) *Attorney, Agent, or Firm* — Norton Rose Fulbright US LLP; James R. Crawford

(57) ABSTRACT

An air conditioning system for motor vehicles designed to blow an air toward a glass window at the time of entry into a defrosting mode. The air conditioning system includes a rear seat controller configured to independently control a temperature and a volume of an air blown toward a rear seat region of a vehicle room, and a control unit configured to, at the time of entry into the defrosting mode, stop cooling or heating of the rear seat region and cause the rear seat controller to display a specific symbol indicating that the cooling or heating of the rear seat region is stopped due to the entry into the defrosting mode.

19 Claims, 5 Drawing Sheets

(51) Int. Cl.
*B60K 37/06* (2006.01)
*B60S 1/02* (2006.01)
*B60K 35/00* (2006.01)
*B60K 37/02* (2006.01)

(52) U.S. Cl.
CPC .............. *B60K 35/00* (2013.01); *B60K 37/02* (2013.01); *B60K 37/06* (2013.01); *B60Q 5/005* (2013.01); *B60S 1/023* (2013.01); *B60H 2001/002* (2013.01)

(56) References Cited

U.S. PATENT DOCUMENTS

2016/0077724 A1* 3/2016 Lee ..................... G06F 3/04817
715/703
2016/0129752 A1* 5/2016 Choi ................. B60H 1/00971
165/203

FOREIGN PATENT DOCUMENTS

| | | | |
|---|---|---|---|
| JP | 2005081887 A | * | 3/2005 |
| JP | 2012-224199 A | | 11/2012 |
| KR | 20110130027 A | | 12/2011 |
| KR | 20130021907 A | | 3/2013 |

\* cited by examiner

[Fig. 1]
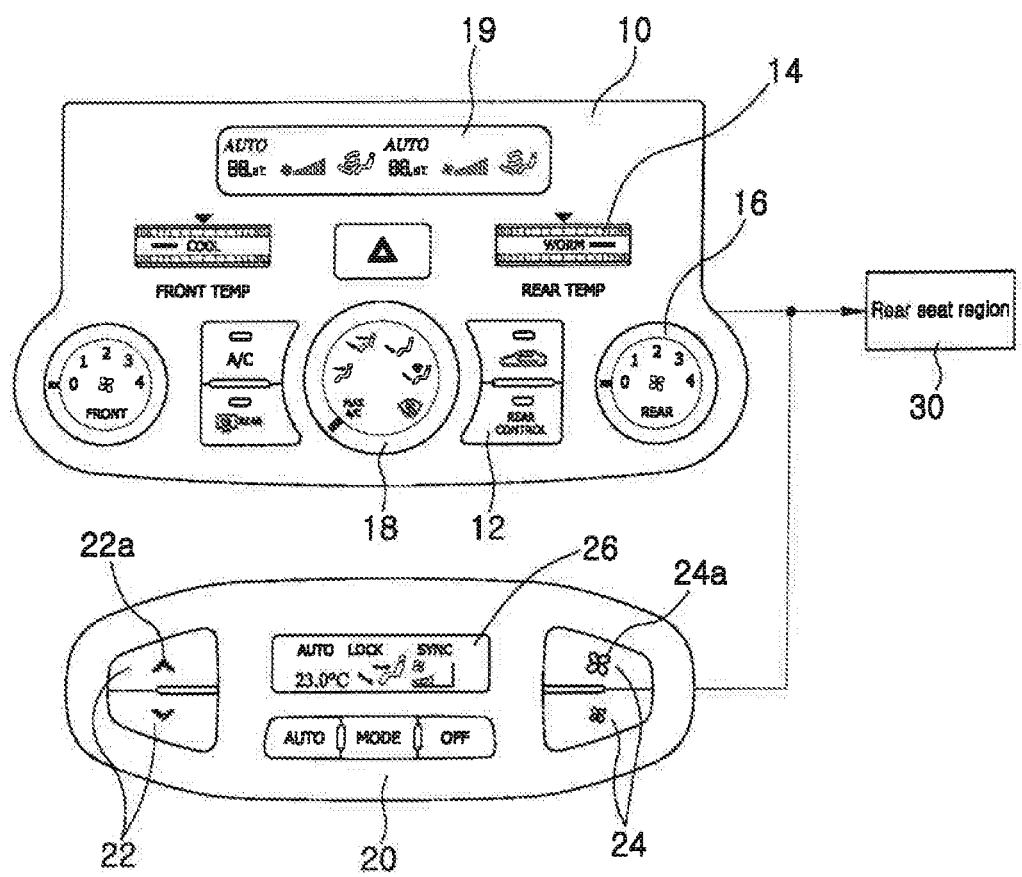

[Fig. 2]
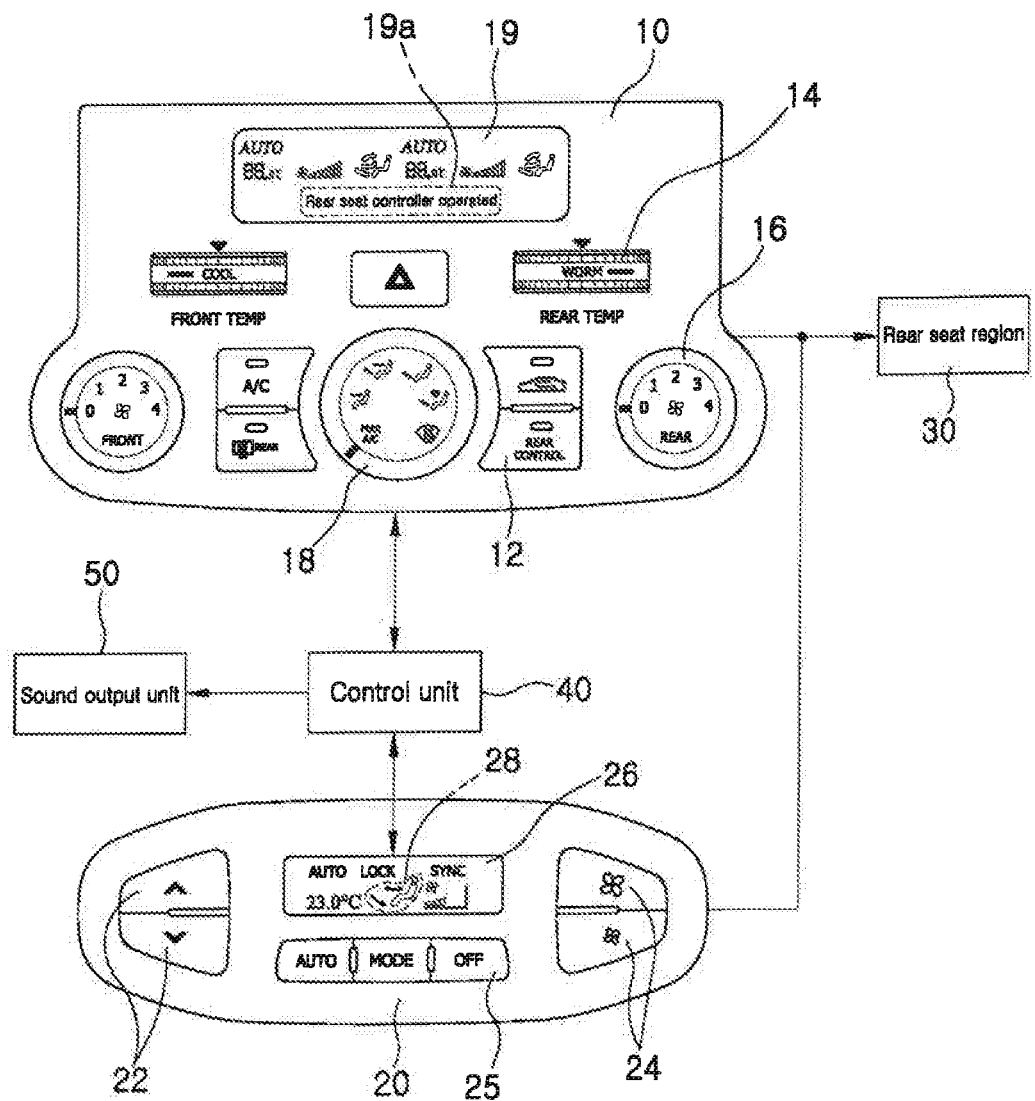

[Fig. 3]
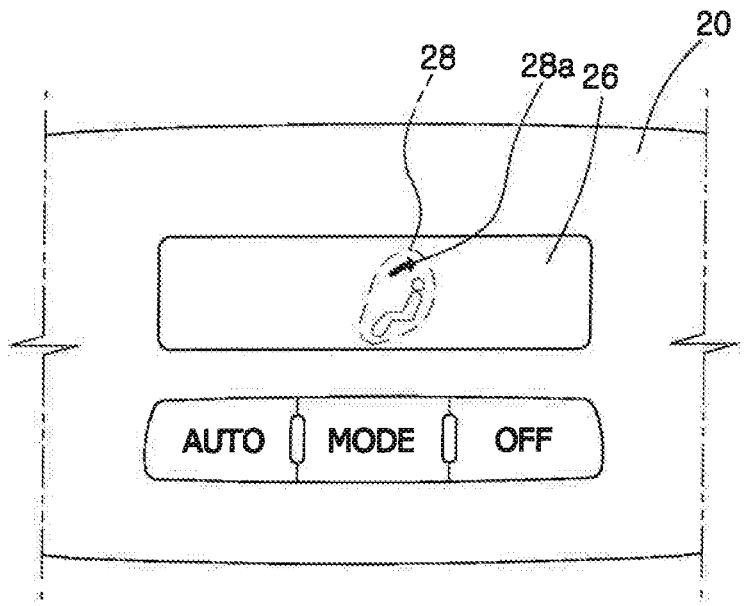
[Fig. 4]
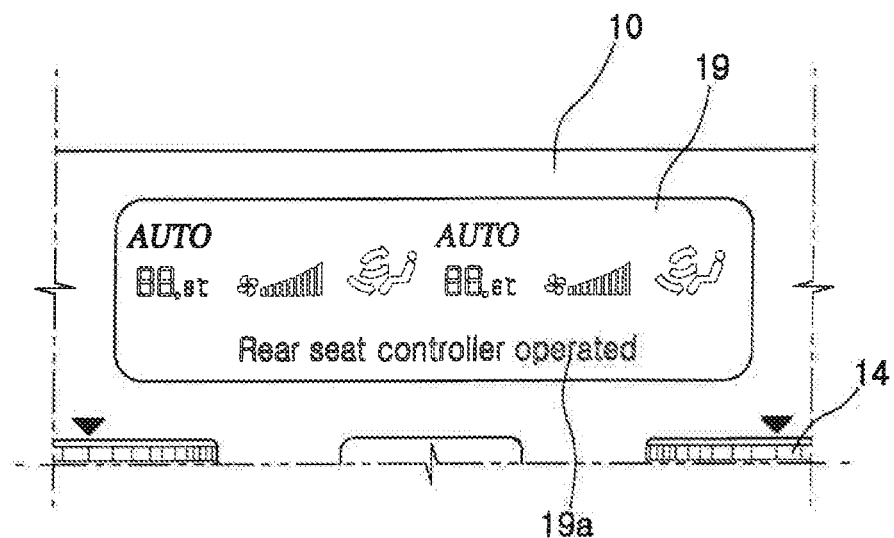

[Fig. 5]
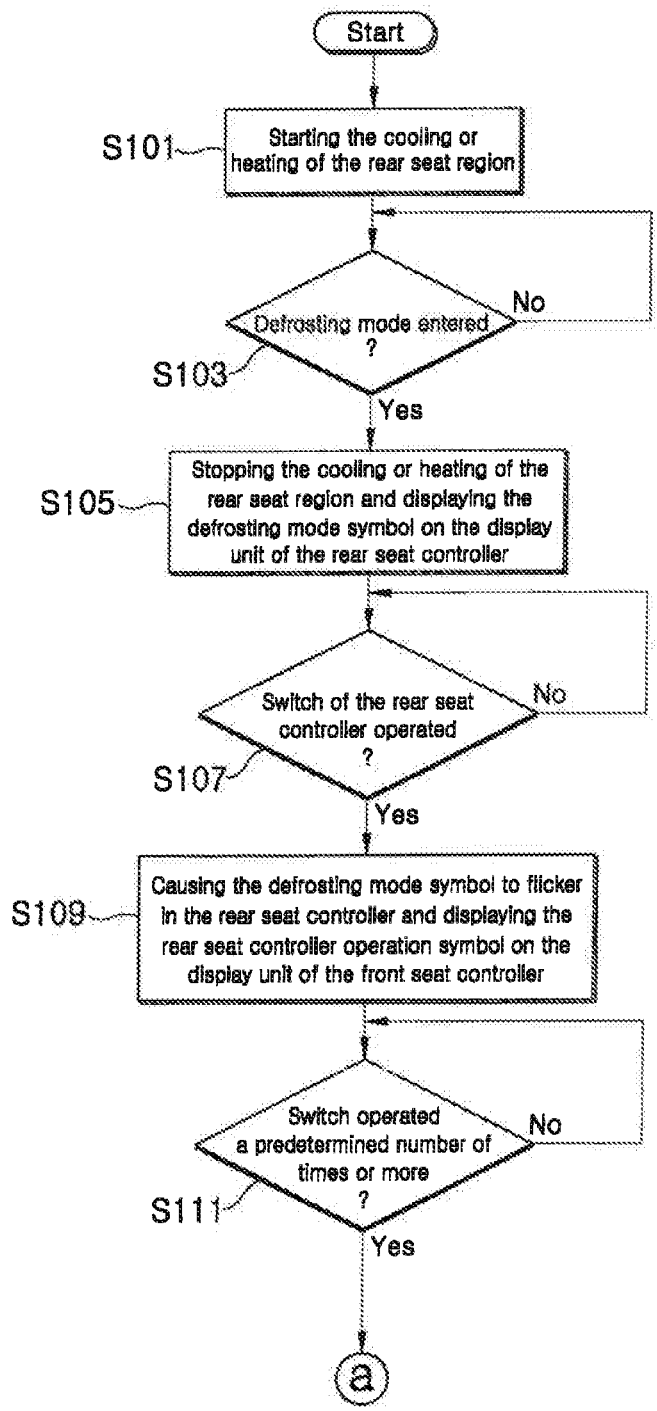

[Fig. 6]
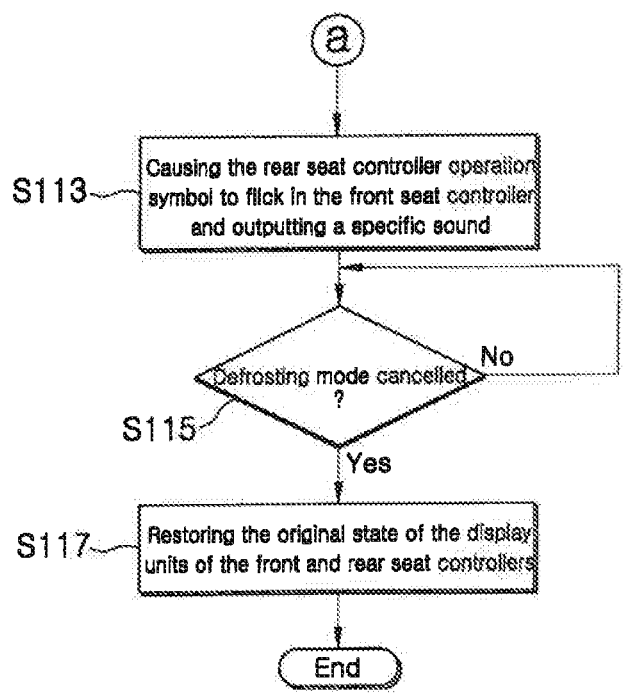

AIR CONDITIONING SYSTEM FOR MOTOR VEHICLES

This application is a § 371 of International Application No. PCT/KR2016/000517 filed Jan. 19, 2016, and claims priority from Korean Patent Application Nos. 10-2015-0009181 filed Jan. 20, 2015 and 10-2016-0005417 filed Jan. 15, 2016.

TECHNICAL FIELD

The present invention relates to an air conditioning system for motor vehicles capable of independently cooling and heating a rear seat region. More particularly, the present invention pertains to an air conditioning system for motor vehicles which is capable of enabling a vehicle occupant to recognize that the cooling and heating of a rear seat region is stopped due to the entry into a defrosting mode and eventually preventing a rear seat occupant from misunderstanding and confusing the stoppage of cooling and heating of a rear seat region at the time of entry into a defrosting mode.

BACKGROUND ART

A rear seat region in a vehicle room is lower in cooling/heating efficiency than a front seat region where an air conditioning system is installed. Thus, it is important to enhance the cooling/heating efficiency in the rear seat region.

As a method of enhancing the cooling/heating efficiency in the rear seat region, there is available a technique of independently cooling and heating a rear seat region in a vehicle room.

In this technique, as shown in FIG. 1, a rear control switch. 12 of a front seat controller 10 is turned on by a user. Then, a rear seat set temperature and a rear seat air volume level are inputted by individually operating a rear seat temperature adjustment switch 14 and a rear seat air volume adjustment switch 16 of a front seat controller 10 or a rear seat temperature adjustment switch 22 and a rear seat air volume adjustment switch 24 of a rear seat controller 20. As a result, the temperature and air volume of the air blown toward a rear seat region 30 are independently controlled according to the rear seat set temperature and the rear seat air volume level thus inputted.

Thus, the rear seat region 30 in the vehicle room is independently cooled and heated. This makes it possible to enhance the cooling/heating efficiency of the rear seat region 30 and to improve the pleasantness in the rear seat region 30.

In the course of independently cooling and heating the rear seat region 30, when the air discharge mode of an air conditioning system is manually or automatically controlled to a defrosting mode, the cooling or heating of the rear seat region 30 is stopped. Specifically, an auxiliary blower (not shown) for a rear seat is turned off so that the air is not blown toward the rear seat region 30.

The reason for employing this configuration is to supply the air, which was previously supplied to the rear seat region 30, to the glass windows of the front seat region (not shown). This makes it possible to increase the volume of the air discharged toward the glass windows of the front seat region, thereby enhancing the defrosting efficiency on the glass windows.

During the control in the defrosting mode, even if the rear seat controller 20 is operated, the cooling or heating of the rear seat region 30 is continuously kept stopped. This is because the defrosting in the glass windows has a higher priority than the cooling or heating of the rear seat region 30. Thus, in the defrosting mode, it is possible to avoid a reduction in the volume of the air discharged toward the glass windows and to enhance the defrosting efficiency on the glass windows.

In the conventional air conditioning system mentioned above, if the air conditioning system is controlled in the defrosting mode while cooling or heating the rear seat region 30, the cooling or heating of the rear seat region 30 is suddenly stopped. In this case, a vehicle occupant in the rear seat region 30 may misunderstand that the cooling or heating of the rear seat region 30 is in error or failure.

In particular, the cooling or heating of the rear seat region 30 is continuously kept stopped even though a vehicle occupant in the rear seat region 30 operates the rear seat controller 20. Therefore, the vehicle occupant in the rear seat region 30 may misunderstand that the air conditioning system suffers from severe trouble.

In view of this, there has been proposed a technique of, when an air conditioning system is controlled in a defrosting mode, turning off a display unit 26 of the rear seat controller 20 and indicators 22a and 24a of individual switches 22 and 24, notifying a vehicle occupant of the fact that the cooling or heating of the rear seat region 30 is stopped.

In this conventional technique, when the air conditioning system is controlled in the defrosting mode, the display unit 26 of the rear seat controller 20 and the indicators 22a and 24a of the individual switches 22 and 24 are turned off. This may deepen the misunderstanding that the cooling or heating of the rear seat region 30 is out of order.

SUMMARY OF THE INVENTION

In view of the aforementioned problems inherent in the related art, it is an object of the present invention to provide an air conditioning system for motor vehicles which is capable of enabling a vehicle occupant to recognize that the cooling and heating of a rear seat region is stopped due to the entry into a defrosting mode.

Another object of the present invention is to provide an air conditioning system for motor vehicles which is configured to enable a rear seat occupant to recognize that the cooling and heating of a rear seat region is stopped due to the entry into a defrosting mode and which is capable of preventing a rear seat occupant from misunderstanding and confusing the stoppage of cooling and heating of a rear seat region at the time of entry into a defrosting mode.

In order to achieve the above objects, there is provided an air conditioning system for motor vehicles, which is designed to blow an air toward a glass window at the time of entry into a defrosting mode, including: a rear seat controller configured to independently control a temperature and a volume of an air blown toward a rear seat region of a vehicle room; and a control unit configured to, at the time of entry into the defrosting mode, stop cooling or heating of the rear seat region and cause the rear seat controller to display a specific symbol indicating that the cooling or heating of the rear seat region is stopped due to the entry into the defrosting mode.

In the air conditioning system, the control unit may be configured to cause a display unit of the rear seat controller to display a defrosting mode symbol indicating that the cooling or heating of the rear seat region is stopped due to the entry into the defrosting mode.

In the air conditioning system, the control unit may be configured to, at the time of entry into the defrosting mode, display the defrosting mode symbol on the display unit of the rear seat controller and removes all indications other than the defrosting mode symbol.

In the air conditioning system, the control unit may be configured to, when a switch of the rear seat controller is operated by a vehicle occupant during the defrosting mode, cause the defrosting mode symbol displayed on the display unit of the rear seat controller to flicker a predetermined number of times at predetermined time intervals for a predetermined time period.

In the air conditioning system, the control unit may be configured to, when a switch of the rear seat controller is operated by a vehicle occupant during the defrosting mode, cause a display unit installed in a front seat region of the vehicle room to display a specific symbol indicating an operation of the switch of the rear seat controller for a predetermined me period.

In the air conditioning system, the control unit may be configured to, when the switch of the rear seat controller is repeatedly operated by the vehicle occupant a predetermined number of times or more during the defrosting mode, cause the specific symbol displayed on the display unit installed in the front seat region to flicker.

According to the present air conditioning system for motor vehicles, at the time of entry into a defrosting mode, a defrosting mode symbol is displayed on a rear seat controller. It is therefore possible to enable a rear seat occupant to recognize that the air conditioning system is currently controlled in the defrosting mode. This enables the rear seat occupant to clearly note that the cooling and heating of the rear seat region is stopped due to the entry into the defrosting mode.

Since the rear seat occupant is enabled to recognize that the cooling and heating of the rear seat region is stopped due to the entry into the defrosting mode, it is possible to prevent the rear seat occupant from misunderstanding and confusing the stoppage of the cooling and heating of the rear seat region at the time of entry into the defrosting mode.

In the case where the rear seat occupant operates the rear seat controller in a state in which the cooling and heating of the rear seat region is stopped due to the entry into the defrosting mode, the operation of the rear seat controller by the rear seat occupant is notified to a front seat occupant using a specific symbol. This enables the front seat occupant to rapidly grasp the intention of the rear seat occupant who wishes to operate the rear seat controller.

Since the front seat occupant can rapidly grasp the intention of the rear seat occupant who wishes to operate the rear seat controller, it is possible to optimally control the air conditioning state of the rear seat region in conformity with the intention and request of the rear seat occupant.

BRIEF DESCRIPTION OF THE DRAWINGS

FIG. 1 is a view showing a conventional air conditioning system for motor vehicles.

FIG. 2 is a view showing an air conditioning system for motor vehicles according to the present invention.

FIG. 3 is a view showing an operation example of the air conditioning system for motor vehicles according to the present invention, in which view the state of a display unit of a rear seat controller at the time of entry into a defrosting mode is illustrated on an enlarged scale.

FIG. 4 is a view showing an operation example of the air conditioning system for motor vehicles according to the present invention, in which view the state of a display unit of a front seat controller when a vehicle occupant operates a rear seat controller during the entry into a defrosting mode is illustrated on an enlarged scale.

FIGS. 5 and 6 are flowcharts showing an operation example of the air conditioning system for motor vehicles according to the present invention.

MODE FOR CARRYING OUT THE INVENTION

Preferred embodiments of an air conditioning system for motor vehicles according to the present invention will now be described in detail with reference to the accompanying drawings. Components similar to those of the related art described earlier will be designated by like reference symbols.

Prior to describing features of an air conditioning system for motor vehicles according to the present invention, the cooling/heating control for a rear seat region will be briefly described with reference to FIG. 2.

In the cooling/heating control for a rear seat region, a rear control switch 12 of a front seat controller 10 is turned on by a user. Then, a rear seat set temperature and a rear seat air volume level are inputted by individually operating a rear seat temperature adjustment switch 14 and a rear seat air volume adjustment switch 16 of the front seat controller 10 or a rear seat temperature adjustment switch 22 and a rear seat air volume adjustment switch 24 of a rear seat controller 20.

As a result, the temperature and air volume of the air blown toward a rear seat region 30 are independently controlled according to the rear seat set temperature and the rear seat air volume level thus inputted. Thus, the rear seat region 30 in the vehicle room is independently cooled or heated.

In the course of independently cooling or heating the rear seat region 30, when the air discharge mode of the air conditioning system is manually or automatically controlled to a defrosting mode, the cooling or heating of the rear seat region 30 is stopped. As a result, the air is not blown toward the rear seat region 30.

Even if the rear seat controller 20 is operated during the time when the air conditioning system is controlled in the defrosting mode, the cooling or heating of the rear seat region 30 is continuously kept stopped.

Next, features of the air conditioning system for motor vehicles according to the present invention will be described in detail with reference to FIGS. 2 to 4.

Referring first to FIG. 2, the air conditioning system according to the present invention includes a control unit 40. The control unit 40 is provided with a microprocessor and is configured to control a display unit 26 of the rear seat controller 20 when the air discharge mode of the air conditioning system is manually or automatically switched to the defrosting mode.

For example, when a user manually selects the defrosting mode by operating a mode selection switch 18 of the front seat controller 10, or when the air discharge mode is automatically switched to the defrosting mode due to the occurrence of frosting on glass windows in an auto mode, or when the air conditioning system is in a state of heating startup control and the air discharge mode is automatically switched to the defrosting mode due to the low external air temperature and the low engine cooling water temperature in an auto mode, the control unit 40 controls the display unit 26 of the rear seat controller 20.

Specifically, the control unit 40 controls an air discharge mode display section 28 of the display unit 26 of the rear seat controller 20 so that a defrosting mode symbol 28a can be displayed as shown in FIG. 3.

Accordingly, when the air conditioning system is controlled in the defrosting mode, it is possible to notify a rear seat occupant of the fact that the air conditioning system is currently controlled in the defrosting mode. This enables the rear seat occupant to recognize that the cooling or heating of the rear seat region 30 is stopped due to the entry into the defrosting mode.

For reference, the term "heating startup control" used herein refers to a technique in which a minimum amount of air is blown toward glass windows when the external air temperature and the engine cooling water temperature are low. According to this technique, it is possible to prevent an air having a low temperature from being directly discharged toward vehicle occupants at the initial startup time in winter.

The control unit 40 is configured to, at the time of control in the defrosting mode, display a defrosting mode symbol 28a on the display unit 26 of the rear seat controller 20 and remove all indications other than the defrosting mode symbol 28a.

For example, the control unit 40 is configured to remove all indications other than the defrosting mode symbol 28a, such as a temperature display section, an air volume display section and the like.

By removing all indications other than the defrosting mode symbol 28a, it is possible to strongly emphasize the fact that the air conditioning system is currently controlled in the defrosting mode. This enables a rear seat occupant to surely recognize the fact that the cooling or heating of the rear seat region 30 is stopped due to the entry into the defrosting mode.

Referring again to FIGS. 2 and 3, when a rear seat occupant arbitrarily pushes and operates a switch of the rear seat controller 20, for example, a rear seat temperature adjustment switch 22, a rear seat air volume adjustment switch 24 or an on/off switch 25, during the control in the defrosting mode, the control unit 40 is configured to flicker the defrosting mode symbol 28a displayed on the display unit 26.

Specifically, the control unit 40 executes control so that, each time when the switch 22, 24 or 25 is operated, the defrosting mode symbol 28a flickers a predetermined number of times at predetermined time intervals for a predetermined time period.

This enables a rear seat occupant to surely recognize that the air conditioning system is currently controlled in the defrosting mode and further that the cooling or heating of the rear seat region 30 is not resumed even if the switch 22, 24 or 25 of the rear seat controller 20 is operated.

In the meantime, when a rear seat occupant arbitrarily pushes and operates a switch of the rear seat controller 20, for example, the rear seat temperature adjustment switch 22, the rear seat air volume adjustment switch 24 or the on/off switch 25, during the control in the defrosting mode, the control unit 40 is configured to control the display unit 19 of the front seat controller 10.

Specifically, as shown in FIG. 4, the control unit 40 controls the display unit 19 of the front seat controller 10 so as to display a specific symbol 19a indicating "rear seat controller operated", for example, characters, a picture or a sign indicating the operation of the rear seat controller 20, for a predetermined time period. This makes it possible to notify a driver or a front seat occupant of the fact that a rear seat occupant is currently operating the rear seat controller 20.

Accordingly, it is possible to urge a driver or a front seat occupant to cancel the defrosting mode. By doing so, the rear seat controller 20 can be brought into an operable state.

If the defrosting mode of the air conditioning system is cancelled, the control unit 40 removes the specific symbol 19a and the defrosting mode symbol 28a displayed on the display units 19 and 26 of the front seat controller 10 and the rear seat controller 20, thereby restoring the original state.

In the present embodiment, there has been described a case where the specific symbol 19a is displayed on the display unit 19 of the front seat controller 10 when the rear seat controller 20 is operated by a rear seat occupant. However, the present invention is not limited thereto. The specific symbol 19a indicating "rear seat controller operated" may be displayed on any display unit installed in the front seat region. For example, the specific symbol 19a indicating "rear seat controller operated" may be displayed on a display unit of a navigator (not shown).

As described above, when the rear seat controller 20 is operated by a rear seat occupant, the control unit 40 controls the display unit 19 of the front seat controller 10 so as to display a specific symbol 19a indicating "rear seat controller operated". In this case, it is preferred that the specific symbol 19a is a character message which indicates the operation of the rear seat controller 20. For example, the specific symbol 19a may be a character message reading "rear seat controller operated".

By informing the operation of the rear seat controller 20 through the use of a character message, it is possible to easily and rapidly notify a driver or a front seat occupant of the fact that the rear seat controller 20 is operated.

Referring again to FIGS. 2 and 4, when the rear seat controller 20 is operated by a rear seat occupant, the control unit 40 notify the operation of the rear seat controller 20 to a driver or a front seat occupant by displaying the specific symbol 19a on the display unit 19 of the front seat controller 10 for a predetermined time period. In this case, if a rear seat occupant repeatedly pushes and operates the switch 22, 24 or 25 of the rear seat controller 20 a predetermined number of times or more, for example, five times or more, the specific symbol 19a displayed on the display unit 19 of the front seat controller 10 is caused to flicker.

This enables a front seat occupant to surely recognize that the rear seat controller 20 is repeatedly operated by a rear seat occupant.

The air conditioning system according to the present invention further includes a sound output unit 50. The sound output unit 50, which is one kind of speaker, is configured to output a specific sound and is controlled by the control unit 40.

If a rear seat occupant repeatedly pushes and operates the switch 22, 24 or 25 of the rear seat controller 20 a predetermined number of times or more, for example, five times or more, in a state in which the air conditioning system is controlled in the defrosting mode, the control unit 40 controls the sound output unit 50.

Specifically, the control unit 40 controls the sound output unit 50 so as to output a predetermined specific sound. This enables a front seat occupant to surely recognize that the rear seat controller 20 is repeatedly operated by a rear seat occupant.

The specific sound outputted from the sound output unit 50 may be a warning sound having a predetermined tone or may be a sound message having a specific meaning. For example, the specific sound may be a sound message which indicates that the rear seat controller was operated by a rear seat occupant.

In the case where the specific sound outputted from the sound output unit 50 may be a warning sound having a predetermined tone, it is preferred that the warning sound is outputted for a predetermined time period. In the case where the specific sound outputted from the sound output unit 50 may be a sound message, it is preferred that the sound message is outputted a predetermined number of times.

Next, an operation example of the air conditioning system according to the present invention will be described in detail with reference to FIGS. 2 to 6.

Referring first to FIGS. 5, 6 and 2, the cooling or heating of the rear seat region 30 is started (S101). In this state, it is determined whether the air conditioning system has entered into the defrosting mode (S103).

If the determination result reveals that the air conditioning system has entered into the defrosting mode, the control unit 40 stops the cooling or heating of the rear seat region 30 and displays the defrosting mode symbol 28a on the display unit 26 of the rear seat controller 20 (S105) (see FIG. 3).

As a result, a rear seat occupant can recognize through the defrosting mode symbol 28a displayed on the rear seat controller 20 that the air conditioning system is currently controlled in the defrosting mode and further that the cooling or heating of the rear seat region 30 is stopped due to the entry into the defrosting mode.

When displaying the defrosting mode symbol 28a on the display unit 26 of the rear seat controller 20, the control unit 40 removes all indications other than the defrosting mode symbol 28a. This enables a rear seat occupant to surely recognize that the air conditioning system is currently controlled in the defrosting mode.

Referring again to FIGS. 5, 6 and 2, the control unit 40 determines whether the switch of the rear seat controller 20 has been operated by a rear seat occupant in a state in which the air conditioning system is controlled in the defrosting mode (S107).

If the determination result reveals that one of the switches of the rear seat controller 20 has been controlled by a rear seat occupant, the control unit 40 flickers the defrosting mode symbol 28a displayed on the rear seat controller 20 (S109).

This enables a rear seat occupant to recognize through the flickering defrosting mode symbol 28a that the air conditioning system has entered into the defrosting mode and further that the cooling or heating of the rear seat region 30 cannot be started or controlled even when operating the switch 22, 24 or 25 of the rear seat controller 20.

When the rear seat controller 20 is operated by a rear seat occupant, the control unit 40 causes the defrosting mode symbol 28a of the rear seat controller 20 to flicker and causes the display unit 19 of the front seat controller 10 to display the specific symbol 19a indicating "rear seat controller operated" for a predetermined time period (S109) (see FIG. 4). For example, the control unit 40 causes the display unit 19 to display a character message reading "rear seat controller operated" for a predetermined time period.

Thus, a front seat occupant can recognize through the specific symbol 19a displayed on the front seat controller 10 that a rear seat occupant is operating the rear seat controller 20. Through this recognition, a front seat occupant can determine whether to cancel the defrosting mode.

When flickering the defrosting mode symbol 28a of the rear seat controller 20 in response to the operation of the rear seat controller 20 by a rear seat occupant, the control unit 40 determines whether the switch of the rear seat controller 20 has been repeatedly operated a predetermined number of times or more, for example, five times or more, by a rear seat occupant (S111).

If the determination result reveals that the switch of the rear seat controller 20 has been repeatedly operated five times or more, the control unit 40 flickers the specific symbol 19a displayed on the display unit 19 of the front seat controller 10 (S113).

Thus, a front seat occupant can recognize through the flickering specific symbol 19a of the front seat controller 10 that a rear seat occupant strongly wishes to operate the rear seat controller 20 and further that a rear seat occupant strongly wants to start the cooling or heating of the rear seat region 30.

If the switch of the rear seat controller 20 has been repeatedly operated a predetermined number of times or more, the control unit 40 controls the sound output unit 50 so as to output a specific sound indicating the repeated operation of the rear seat controller 20 (S113). For example, the sound output unit 50 outputs a warning sound having a predetermined tone or a sound message which indicates that the rear seat controller was operated by a rear seat occupant.

Thus, a front seat occupant can surely recognize through the specific sound outputted from the sound output unit 50 that a rear seat occupant has an intention to operate the rear seat controller 20.

Referring again to FIGS. 5, 6 and 2, the control unit 40 determines whether the defrosting mode of the air conditioning system has been cancelled (S115).

If the determination result reveals that the defrosting mode has been cancelled, the control unit 40 removes the specific symbol 19a and the defrosting mode symbol 28a displayed on the display units 19 and 26 of the front seat controller 10 and the rear seat controller 20 and restores the original state (S117). In the case where a specific sound is outputted from the sound output unit 50, the control unit 40 stops outputting the specific sound.

According to the present air conditioning system configured as described above, at the time of entry into the defrosting mode, the defrosting mode symbol 28a is displayed on the rear seat controller 20. It is therefore possible to enable a rear seat occupant to recognize that the air conditioning system is currently controlled in the defrosting mode. This enables the rear seat occupant to clearly note that the cooling and heating of the rear seat region is stopped due to the entry into the defrosting mode.

Since the rear seat occupant is enabled to recognize that the cooling and heating of the rear seat region 30 is stopped due to the entry into the defrosting mode, it is possible to prevent the rear seat occupant from misunderstanding and confusing the stoppage of the cooling and heating of the rear seat region 30 at the time of entry into the defrosting mode.

In the case where the rear seat occupant operates the rear seat controller 20 in a state in which the cooling and heating of the rear seat region 30 is stopped due to the entry into the defrosting mode, the operation of the rear seat controller 20 by the rear seat occupant is notified to a front seat occupant using the specific symbol 19a. This enables the front seat occupant to rapidly grasp the intention of the rear seat occupant who wishes to operate the rear seat controller 20.

Since the front seat occupant can rapidly grasp the intention of the rear seat occupant who wishes to operate the rear seat controller 20, it is possible to optimally control the air conditioning state of the rear seat region 30 in conformity with the intention and request of the rear seat occupant.

While some preferred embodiments of the present invention have been described above, the present invention is not

| Description of Reference Numerals | | | |
|---|---|---|---|
| 10: | front seat controller | 12: | rear control switch |
| 14: | rear seat temperature adjustment switch | | |
| 16: | rear seat air volume adjustment switch | | |
| 19: | display unit | 19a: | specific symbol |
| 20: | rear seat controller | | |
| 22: | rear seat temperature adjustment switch | | |
| 24: | rear seat air volume adjustment switch | | |
| 25: | on/off switch | 26: | display unit |
| 28: | air discharge mode display section | | |
| 28a: | defrosting mode symbol | 30: | rear seat region |
| 40: | control unit | 50: | sound output unit |

What is claimed is:

1. An air conditioning system for motor vehicles, which is designed to blow an air toward a glass window at the time of entry into a defrosting mode, comprising:
a front seat controller configured to control a temperature and a volume of an air blown toward a front seat region and a rear seat region of a vehicle room;
a rear seat controller configured to independently control a temperature and a volume of an air blown toward a rear seat region of a vehicle room; and
a control unit configured to, at the time of entry into the defrosting mode, stop cooling or heating of the rear seat region and block air toward the rear seat region and cause the rear seat controller to display a specific symbol indicating that the cooling or heating of the rear seat region is stopped due to the entry into the defrosting mode,
and wherein cooling and heating of the rear seat region maintains stop condition even if the rear seat controller is operated during the defrosting mode,
wherein the control unit is configured to cause a display unit of the rear seat controller to display a defrosting mode symbol indicating that the cooling or heating of the rear seat region is stopped due to the entry into the defrosting mode:
wherein the motor vehicle comprises a front seat region, and
wherein the rear seat region has a lower cooling/heating efficiency than a front seat region, and
wherein the air conditioning system is installed in the front seat region.

2. The air conditioning system of claim 1, wherein the control unit is configured to, at the time of entry into the defrosting mode, display the defrosting mode symbol on the display unit of the rear seat controller and removes all indications other than the defrosting mode symbol.

3. The air conditioning system of claim 2, wherein the control unit is configured to, when a switch of the rear seat controller is operated by a vehicle occupant during the defrosting mode, cause the defrosting mode symbol displayed on the display unit of the rear seat controller to flicker a predetermined number of times at predetermined time intervals for a predetermined time period.

4. The air conditioning system of claim 1, wherein the control unit is configured to, when a switch of the rear seat controller is operated by a vehicle occupant during the defrosting mode, cause a display unit installed in a front seat region of the vehicle room to display a specific symbol indicating an operation of the switch of the rear seat controller for a predetermined time period.

5. The air conditioning system of claim 4, wherein the control unit is configured to, when the switch of the rear seat controller is repeatedly operated by the vehicle occupant a predetermined number of times or more during the defrosting mode, cause the specific symbol displayed on the display unit installed in the front seat region to flicker.

6. The air conditioning system of claim 5, wherein the control unit is configured to, when the switch of the rear seat controller is operated by the vehicle occupant during the defrosting mode, cause a display unit of a front seat controller to display the specific symbol indicating the operation of the switch of the rear seat controller.

7. The air conditioning system of claim 6, wherein the specific symbol displayed in the display unit of the front seat region when the switch of the rear seat controller is operated by the vehicle occupant during the defrosting mode is a character message indicating an operation of the switch of the rear seat controller.

8. The air conditioning system of claim 5, wherein the control unit is configured to, when the switch of the rear seat controller is operated by the vehicle occupant during the defrosting mode, cause a display unit of a navigator installed in the front seat region to display the specific symbol indicating the operation of the switch of the rear seat controller.

9. The air conditioning system of claim 5, further comprising:
a sound output unit,
wherein the control unit is configured to, when the switch of the rear seat controller is repeatedly operated by the vehicle occupant a predetermined number of times or more during the defrosting mode, cause the sound output unit to output a predetermined specific sound.

10. The air conditioning system of claim 9, wherein the specific sound outputted from the sound output unit when the switch of the rear seat controller is repeatedly operated by the vehicle occupant a predetermined number of times or more during the defrosting mode is a warning sound having a predetermined tone, and the control unit is configured to notify the repeated operation of the rear seat controller by causing the sound output unit to output the warning sound for a predetermined time period.

11. The air conditioning system of claim 9, wherein the specific sound outputted from the sound output unit when the switch of the rear seat controller is repeatedly operated by the vehicle occupant a predetermined number of times or more during the defrosting mode is a sound message indicating the repeated operation of the switch of the rear seat controller, and the control unit is configured to notify the repeated operation of the rear seat controller by causing the sound output unit to output the sound message a predetermined number of times.

12. The air conditioning system of claim 5, wherein the specific symbol displayed in the display unit of the front seat region when the switch of the rear seat controller is operated by the vehicle occupant during the defrosting mode is a character message indicating an operation of the switch of the rear seat controller.

13. The air conditioning system of claim 4, wherein the specific symbol displayed in the display unit of the front seat region when the switch of the rear seat controller is operated by the vehicle occupant during the defrosting mode is a character message indicating an operation of the switch of the rear seat controller.

14. The air conditioning system of claim 1, wherein the control unit has a button for controlling the cooling or heating of the rear seat region and the rear seat controller, when the defrosting mode is manually selected by a user.

15. The air conditioning system of claim 14, wherein the control unit is configured to, when an air discharge mode is automatically switched to the defrosting mode due to occurrence of frosting on the glass window, control the cooling or heating of the rear seat region and the rear seat controller.

16. The air conditioning system of claim 15, wherein the control unit is configured to, when the air conditioning system is in a state of heating startup control and the air discharge mode is automatically switched to the defrosting mode due to a low external air temperature and a low engine cooling water temperature, control the cooling or heating of the rear seat region and the rear seat controller.

17. The air conditioning system of claim 1, wherein the control unit is configured to, when the defrosting mode is cancelled, remove the defrosting mode symbol displayed on the display unit of the rear seat controller to restore an original state.

18. The air conditioning system of claim 1, wherein the control unit is configured to, when the defrosting mode is cancelled, remove the specific symbol displayed on the display unit of the front seat region to restore an original state.

19. The air conditioning system of claim 1, wherein the control unit is configured to, when the defrosting mode is cancelled, cause the sound output unit to stop outputting the specific sound.

* * * * *